United States Patent [19]

Schott et al.

[11] 4,290,462

[45] Sep. 22, 1981

[54] LUBRICATING APPARATUS AND SYSTEM

[76] Inventors: Lawrence A. Schott, 15940 Warwick Rd., Detroit, Mich. 48223; Roger A. Schott, 15060 Seminole, Redford, Mich. 48239

[21] Appl. No.: 58,117

[22] Filed: Jul. 16, 1979

[51] Int. Cl.³ .............................................. B65B 3/04
[52] U.S. Cl. ...................................... 141/98; 141/232; 52/169.1; 52/236.3; 137/234.6; 137/356; 184/1.5
[58] Field of Search ...................... 184/1.5; 141/98, 1, 141/392, 231, 232, 233; 137/356, 357, 358, 359, 360, 361, 362, 234.6; 52/169.1, 169.2, 169.5, 236.3, 236.4, 185, 175; D25/33, 34

[56] References Cited

U.S. PATENT DOCUMENTS

| 4,111,282 | 9/1978 | Vayda | 141/98 |
| 4,188,985 | 2/1980 | Ostermann | 184/1.5 |

*Primary Examiner*—Houston S. Bell, Jr.
*Attorney, Agent, or Firm*—Barnes, Kisselle, Raisch & Choate

[57] ABSTRACT

A system and apparatus for under chassis servicing of vehicles for oil change and lubrication which involves a central cashier's booth with a plurality of service stalls radially disposed. Special self-adjusting ramp track pairs are provided at each service stall to accommodate vehicles with different track widths. The ramp tracks are responsive to the front wheel tires and parallelling mechanism maintains the parallel relationship of the tracks.

7 Claims, 5 Drawing Figures

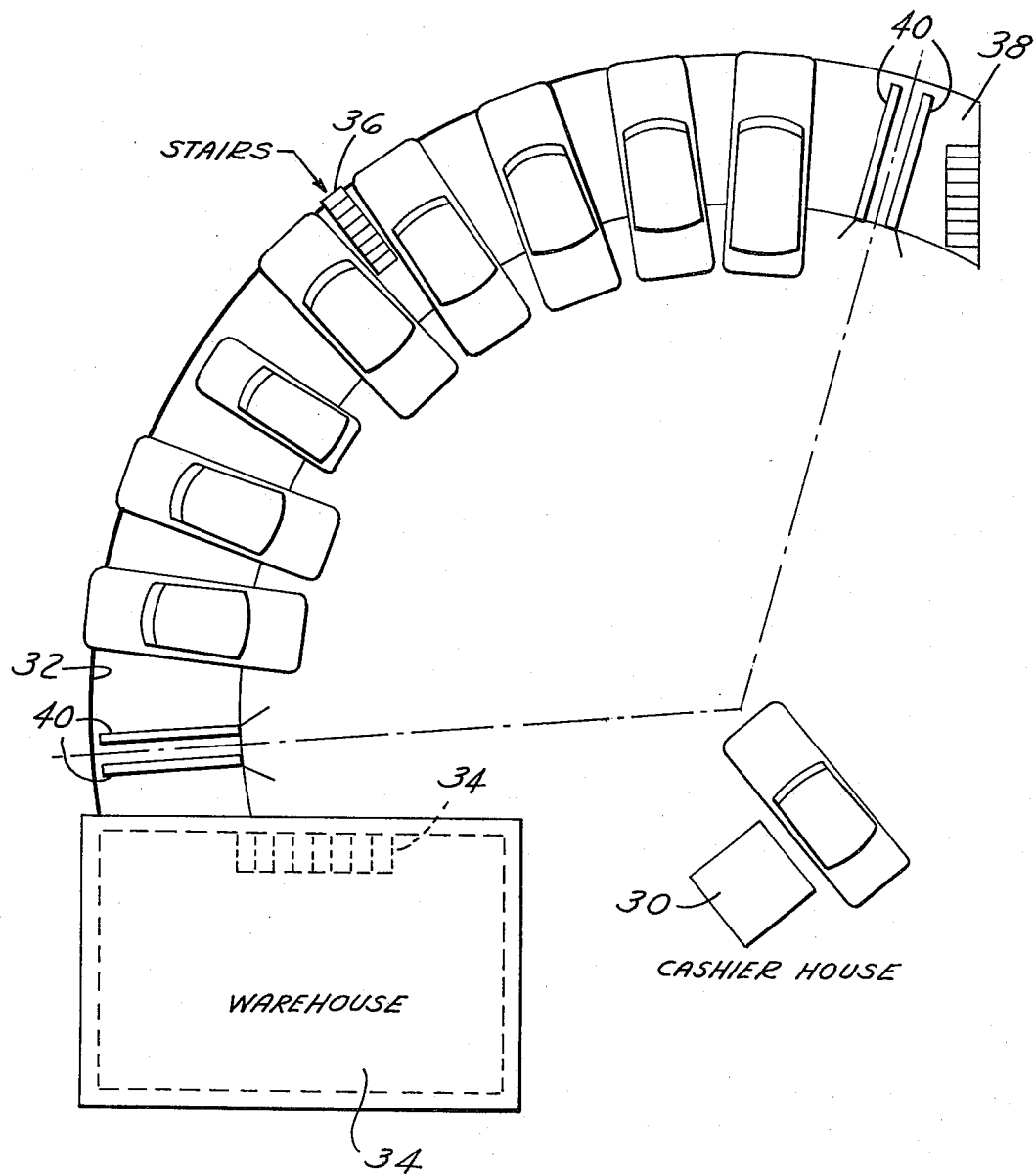

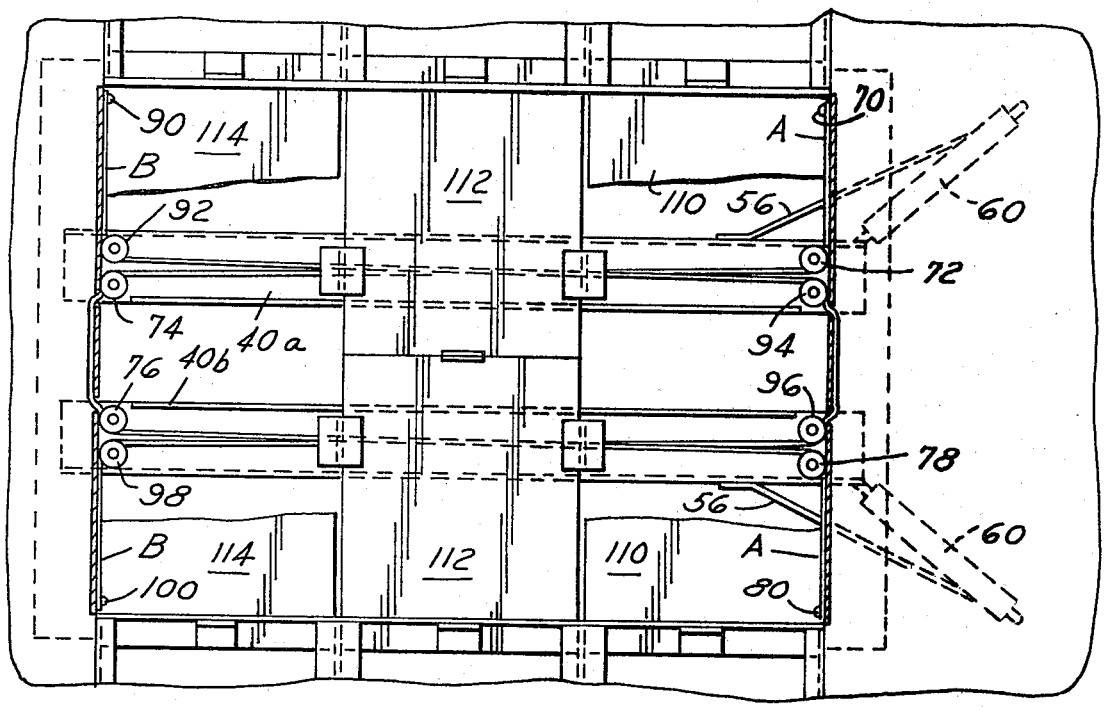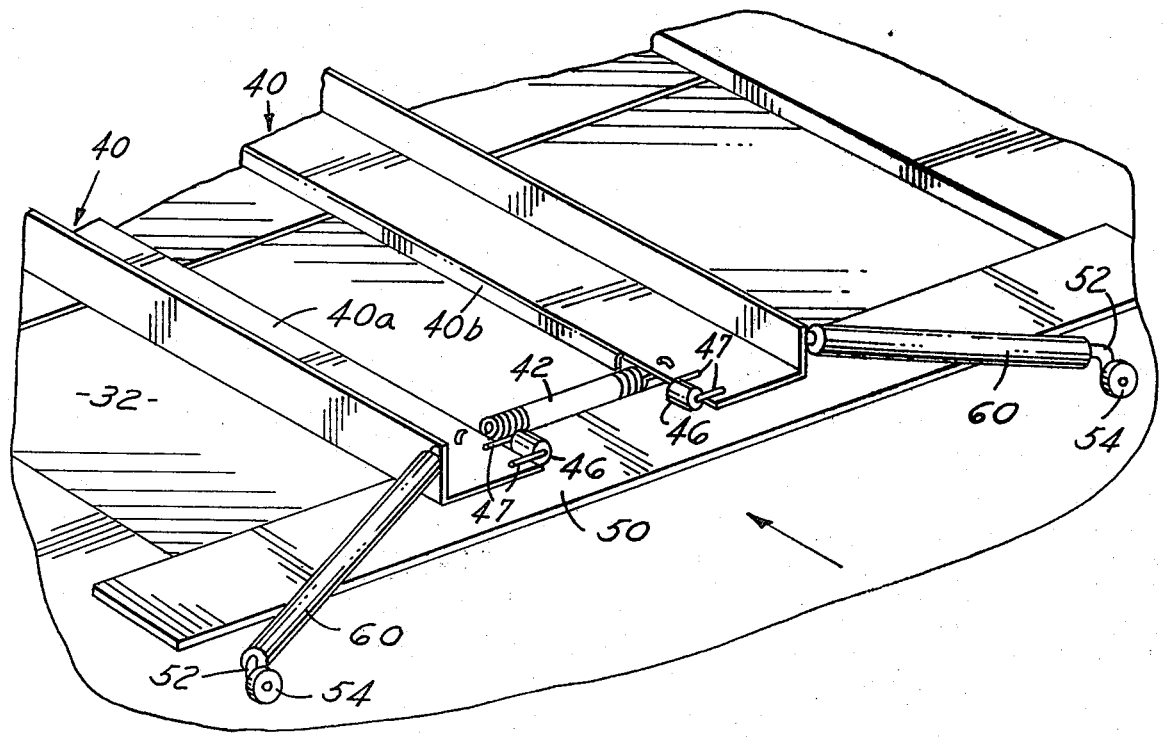

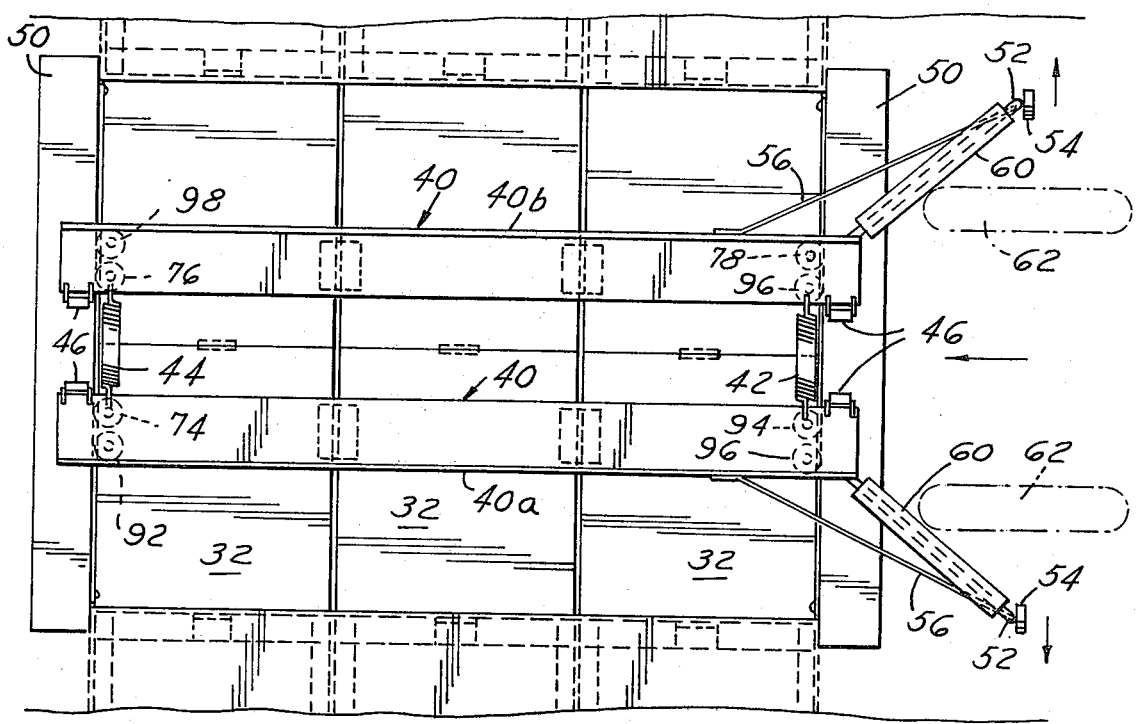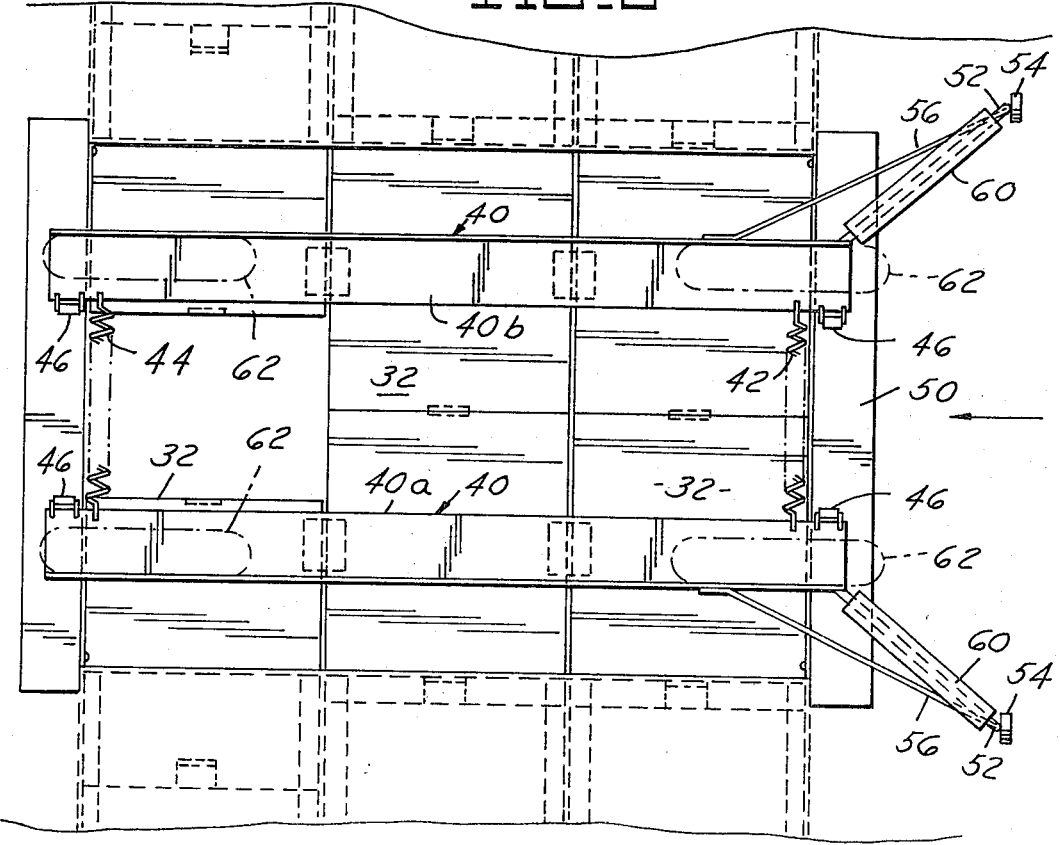

LUBRICATING APPARATUS AND SYSTEM

FIELD OF INVENTION

The servicing of automotive vehicles, particularly in the area of oil change and chassis lubrication, from beneath the vehicle.

BACKGROUND AND OBJECTS OF THE INVENTION

The trend in today's economy is toward drive-in service whether it be banking, food service, or even party stores. Changing of oil in a vehicle usually involves leaving the vehicle at a gas station for a few hours, or, if service is immediately available, waiting for at the least a half hour while the vehicle is lifted onto a hoist and serviced. If the attendant must also man the pumps, there are frequent interruptions as the service progresses.

Because of this inconvenience, an oil change is oft times put off and delayed beyond the normal mileage period to the detriment of the engine.

It is an object of the present invention to provide apparatus and a system whereby an oil change, and even a lubrication, can be provided on a drive-in basis from a position below the vehicle and in a matter of minutes, thus reducing the inconvenience to the vehicle owner and increasing the possibilities of a timely oil change.

The track width (gage) of vehicles today varies greatly from the wide track Pontiac to the very small foreign and domestic vehicles made for fuel economy and lower price-range markets. The present invention contemplates apparatus for support over an open service chamber of all passenger vehicles regardless of track width. Other objects of the invention will be apparent in the following description and claims.

BRIEF DESCRIPTION OF THE INVENTION

The objects of the invention are accomplished by providing a land site with a plurality of service stalls arranged, preferably in an arcuate pattern, each with a vehicle track, automatically adjustable to fit varying axle and tire track widths, together with a central surface cashier station, from which the driver will be directed to a particular change stall. Apparatus to remove old oil and inject new oil is available in the service chamber so an operator can change oil and also provide a chassis lubrication in a very short time.

BRIEF DESCRIPTION OF THE DRAWINGS

Drawings accompany the disclosure and the various views thereof may be briefly described as:

FIG. 1, a plan layout of a site for the oil change service.

FIG. 2, a perspective view of an adjustable vehicle track support.

FIG. 3, a bottom view of the track support.

FIG. 4, a top view of the track support in an at rest position.

FIG. 5, a top view of a track support adjusted to a particular vehicle.

DESCRIPTION OF THE INVENTION AND THE MANNER AND PROCESS OF MAKING AND USING IT

With reference to the illustration in FIG. 1, a land site is illustrated having a center area at which is located a cashier house. Spaced outwardly from this center area is an arcuate service area 32 open at the top. At one end is a warehouse which has a room accessible from the service area and having a stairway 34 leading to ground level. A stairway 36 is provided centrally of the arcuate service room and also at the other end is a stairway 38. The service area can be either underground level or above ground level as long as the operators can work below the vehicle.

The arcuate service room is suitably lined with building material in the form of tile or concrete blocks and has suitable drainage facilities provided to building code standards.

Spaced around the arcuate service room are stations, or stalls, each of which includes a pair of wheel support tracks 40, adjustable, as will be described, to fit varying vehicle track widths. The warehouse 34 may have an above ground area if desired. Each station will be numbered so that the cashier may direct a driver to a particular station after he has paid for the requested service.

In FIG. 2, a perspective view of a single station is shown with tracks 40 in parallel relation. A top view of the track is also shown in FIG. 4. Coil springs 42 and 44 in tension are fastened between the tracks at the respective ends to pull the tracks together to a minimum dimension. The ends of the tracks are mounted on rollers 46 which ride on suitable surfaces 50 so the tracks will move easily laterally when not carrying a vehicle. To accommodate various wheel spreads, a means is provided to move the tracks in response to the approach of a vehicle.

Diverging from the entrance ends of the tracks are braced arms 52 mounted at the free ends on rollers 54 which have an axis parallel to the tracks 40. Braces 56 (FIG. 4) rigidify the arms 52. Elongate rollers 60 are mounted on arms 52 positioned to contact the front wheels of an entering vehicle. As illustrated in FIG. 4, a vehicle with front wheels 62 is approaching the assigned station and the tires are in contact with rollers 60. As the vehicle approaches, it will wedge the tracks apart until the tracks are spaced properly as shown in FIG. 5.

The wedging force on the tracks is preferably transmitted to the rear end of the tracks so that the tracks will move in parallel relation. In the bottom view of FIG. 3, a pulley system to accomplish this parallel movement is shown. Pulley cable A, anchored at 70, passes around pulleys 72, 74, 76 and 78 to an anchor point 80. Pulleys 72 and 74 are on track 40*a* and pulleys 76 and 78 are on track 40*b*. Pulley cable B is anchored at 90 and passes around pulleys 92 and 94 on track 40*a* and pulleys 96 and 98 on track 40*b* to an anchor point 100. Thus, any outward motion of the tracks 40 at the entrance end will be reflected by the pulley cables A and B to the other ends of the tracks to cause them to move in a parallel relation on the roller supports 46. These rollers are designed and dimensioned to carry the dead load of the track supports but will not roll once the weight of a vehicle is borne by the tracks. This can be accomplished by mounting the rollers on resilient arms 47 (FIG. 2) which will flex to ground the tracks 40 when bearing the vehicle load.

Thus, regardless of the width of the vehicle tire track, the supporting tracks will move outwardly to adjust to the proper width. If desired, sliding covers 110, 112 and 114 (FIG. 3) can be used to cover the service area to protect the operators. These covers can move with the tracks to an open position when the tracks are separated by the presence of a vehicle or be manually shiftable.

When a car arrives on the tracks at a particular station, the operator can quickly drain the old oil into a waiting funnel connected to an individual or a common sump. Once drained, the crankcase can be flushed, if this service is ordered, and the oil filter changed. New oil can be introduced in a metered quantity through a self-sealing nozzle introduced directly into the drain plug opening. When the filling nozzle is withdrawn, the oil drain plug can be quickly inserted to retain the oil in the engine crankcase.

If chassis lubrication is to be done, this can also be quickly accomplished while oil is draining. Such checking as is necessary of hydraulic steering liquid and so forth at ground level can be done by a roving operator at the vehicle level working simultaneously with the operator below the vehicle.

We claim:

1. A system of servicing vehicles for oil change and lubrication and the like which comprises:
   (a) one or more service stalls for an operator,
   (b) a cashier's booth placed at vehicle level in lineal relation to the one or more stalls,
   (c) a vehicle support track over the service stall to support a vehicle temporarily while being serviced, and
   (d) said vehicle support tracks comprising:
       (1) a pair of parallel tracks in spaced relation,
       (2) means to support said tracks adjacent a service stall for movement transversely in relation to each other, and
       (3) means responsive to contact with the front wheels of a vehicle to cause said track to move to register with the track width of a particular vehicle.

2. A system as defined in claim 1 in which means is provided to move and bias said tracks toward each other in the absence of vehicle contact.

3. A system as defined in claim 1 in which said means responsive to contact with the front wheels of a vehicle comprises contact bars extending from each track and disposed angularly whereby contact with wheels of an approaching vehicle will move said tracks transversely to receive said wheels in proper registry.

4. A system as defined in claim 3 in which said diverging bars carry rollers to contact the wheels of a vehicle.

5. A system as defined in claim 3 in which a cable response system is incorporated with said separable tracks wherein a separating force on said bars at the lead in end of said tracks is transmitted to the other end of said tracks to cause an equal response at said other ends.

6. A system as defined in claim 5 in which said cable response system comprises two cables anchored to stationary points at opposite ends of said tracks, each said cable passing around pulleys at each end of said respective tracks wherein a separation of said tracks at one end will effect separation in parallel relation of said tracks at the other end.

7. A system as defined in claim 1 in which said means to support said tracks adjacent a service stall comprises rollers supporting each track at opposite ends, support means below said rollers to support said rollers in a transverse movement, and resiliently displaceable means associating said rollers with said track whereby a vehicle load on said tracks will displace said rollers allowing said tracks to rest immovably on said support means.

* * * * *

UNITED STATES PATENT AND TRADEMARK OFFICE
CERTIFICATE OF CORRECTION

PATENT NO. : 4,290,462
DATED : September 22, 1981
INVENTOR(S) : Lawrence A. Schott and Roger A. Schott It is certified that error appears in the above-identified patent and that said Letters Patent are hereby corrected as shown below:

Col. 4, Lines 12, 13, change "diverging" to "angularly disposed".

Col. 4, Line 15, change "separable" to "transversely movable".

Col. 4, Line 16, change "separating" to "transverse".

Signed and Sealed this

Sixteenth Day of February 1982

[SEAL]

Attest:

*Attesting Officer*

GERALD J. MOSSINGHOFF

*Commissioner of Patents and Trademarks*